April 30, 1957 A. C. GRIFFITH 2,790,527
MERCHANDISE DISTRIBUTING APPARATUS FOR WAREHOUSES
Filed Aug. 26, 1954 3 Sheets-Sheet 1
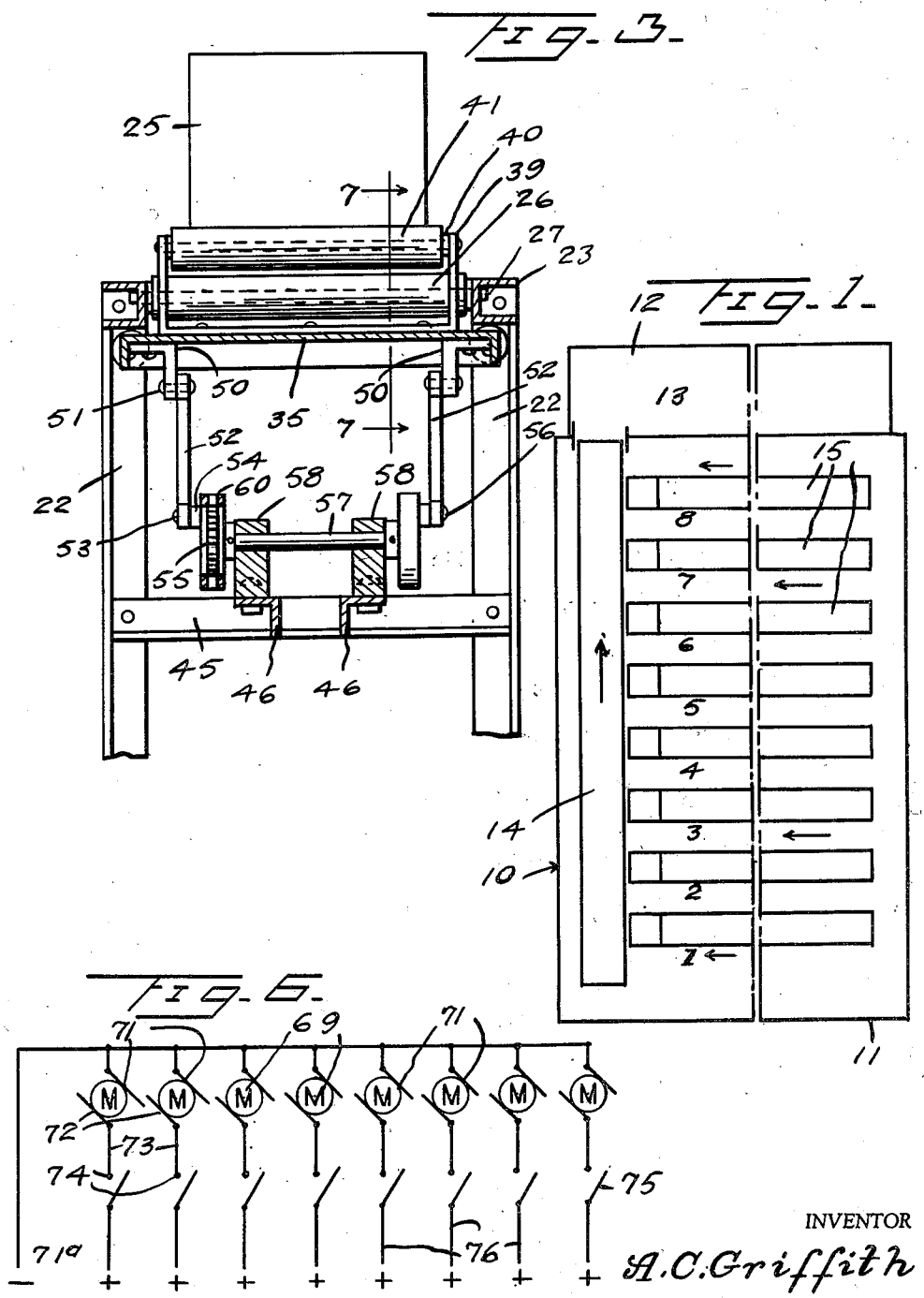
INVENTOR
A. C. Griffith
BY Kimmel & Crowell
ATTORNEYS

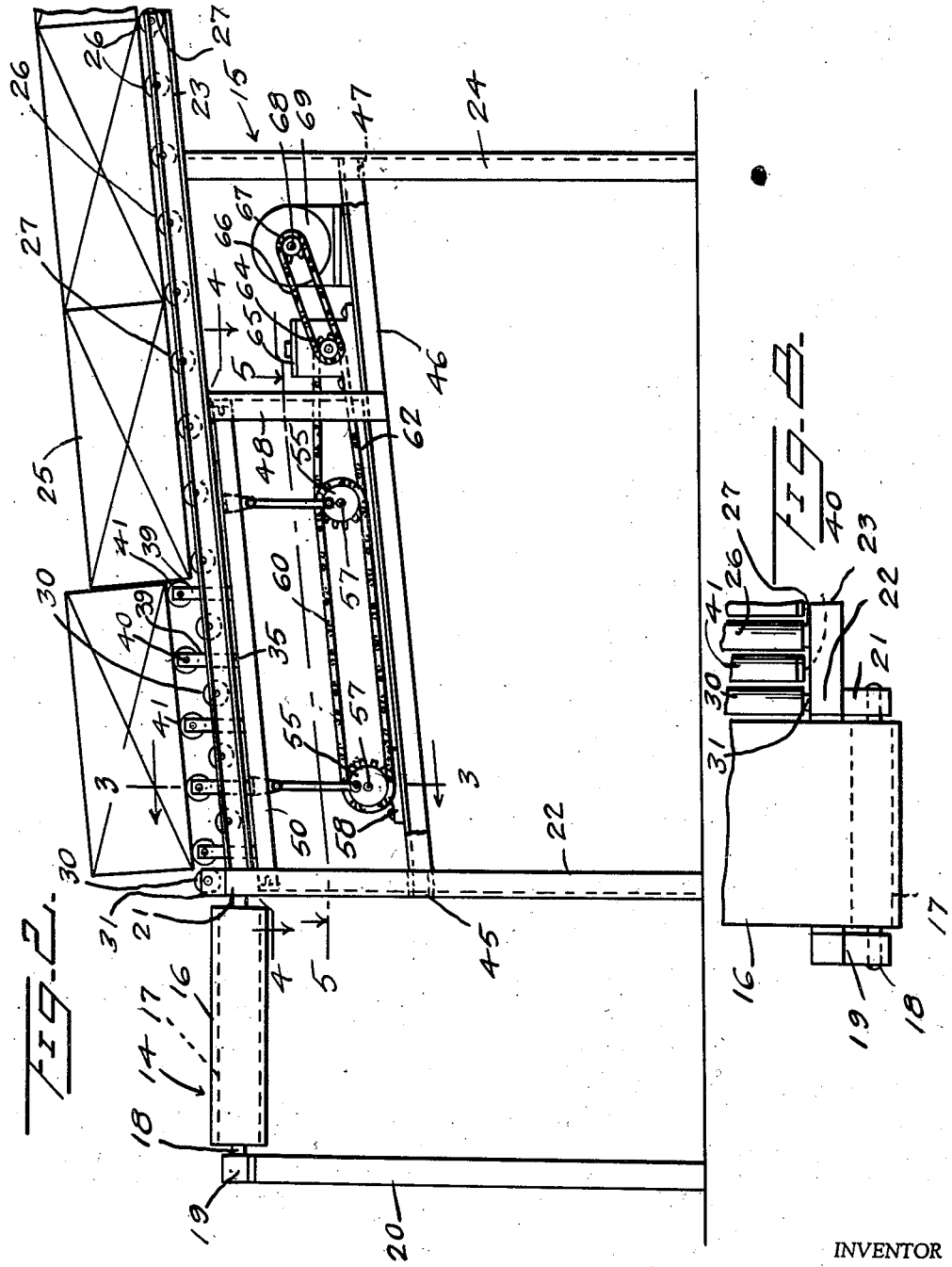

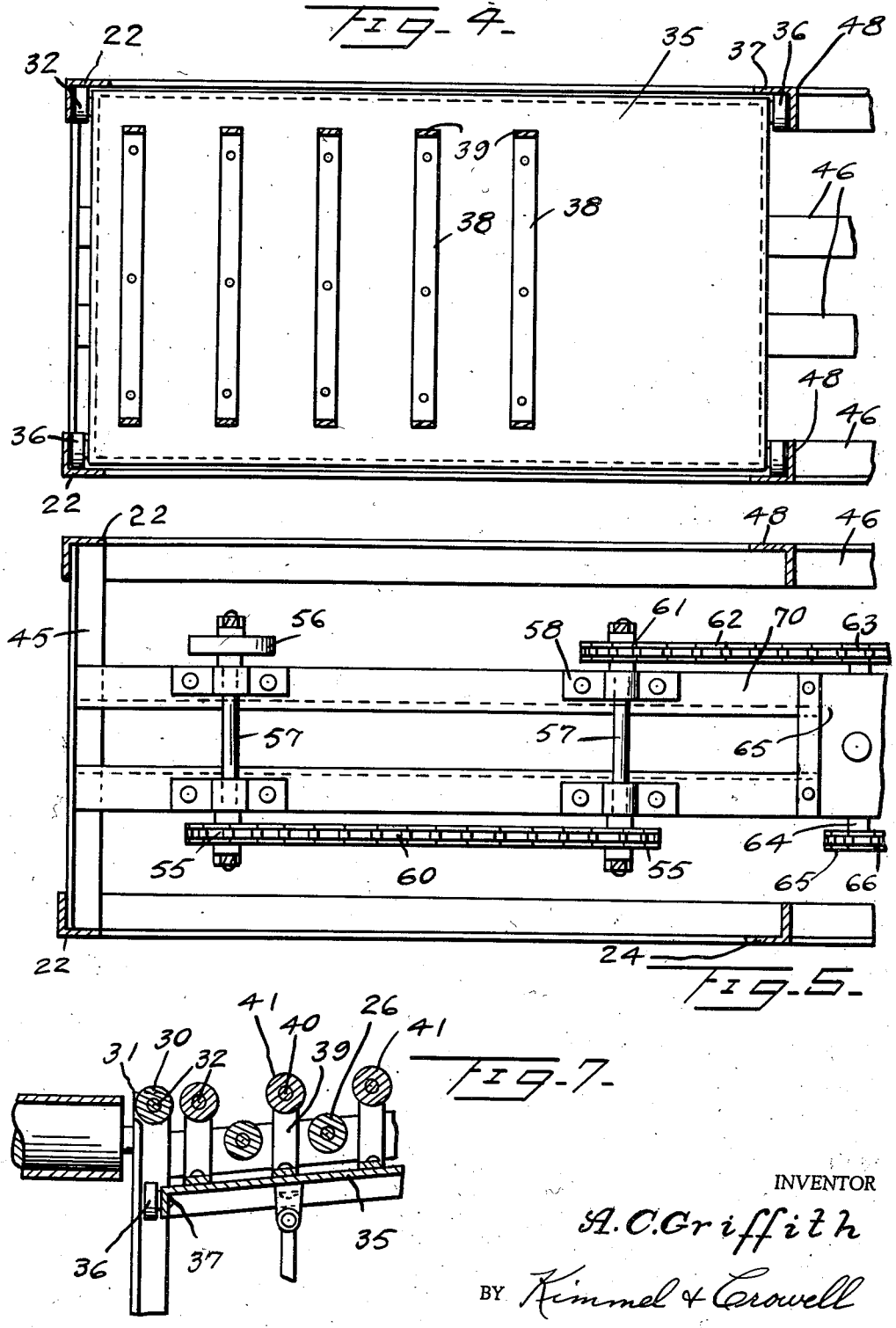

United States Patent Office 2,790,527
Patented Apr. 30, 1957

2,790,527

MERCHANDISE DISTRIBUTING APPARATUS FOR WAREHOUSES

Arthur C. Griffith, Kingston, Pa.

Application August 26, 1954, Serial No. 452,409

1 Claim. (Cl. 193—35)

This invention relates to a merchandise distributing apparatus for warehouses and the like and has as its primary object the provision of apparatus to facilitate and expedite the distribution of packaged merchandise from stored position in a warehouse to a shipping platform or the like.

An additional object of the invention is the provision of mechanical means including gravity conveyors and an endless conveyor for selecting a package of merchandise from a given position, conveying the same to a shipping platform without the necessity of manual handling.

A further object of the invention resides in the provision of means which may be actuated from a remote point whereby the quantity of packages of a particular type goods or merchandise to be passed to the shipping platform may be selected as desired.

A still further object of the invention resides in the provision of means whereby merchandise from a selected stack or stacks may be directly passed by gravity conveyors to an endless belt conveyor leading directly to the shipping platform.

Still other objects reside in the combination of elements, arrangement of parts, and features of construction, all of which will be more fully pointed out hereinafter and disclosed in the accompanying drawing wherein there is shown a preferred embodiment of this invention concept.

In the drawings:

Figure 1 is a schematic top plan view of a warehouse for the storage of packaged goods incorporating the apparatus of the instant invention;

Figure 2 is a side elevational view, certain concealed parts being indicated in dotted lines, of one of the gravity conveyors adapted for transporting merchandise to the endless conveyor;

Figure 3 is a sectional view taken substantially along the line 3—3 of Figure 2, as viewed in the direction indicated by the arrows;

Figure 4 is a sectional view taken substantially along the line 4—4 of Figure 2, as viewed in the direction indicated by the arrows;

Figure 5 is a sectional view taken substantially along the line 5—5 of Figure 2, as viewed in the direction indicated by the arrows;

Figure 6 is a schematic wiring diagram of electrical motors employed in the control of the gravity conveyors;

Figure 7 is a fragmentary detailed sectional view taken substantially along the line 7—7 of Figure 3, as viewed in the direction indicated by the arrows; and Figure 8 is a fragmentary top plan view of portions of the structure as shown in Figure 2.

Similar reference characters refer to similar parts throughout the several views of the drawings.

Having reference now to the drawings in detail. There is generally indicated at 10 a warehouse, including a building structure 11 of any desired size, number of floors, and construction, which building has at one end a shipping platform 12 and an exit door 13 leading from the interior of the building to the platform. An endless conveyor belt 14, of desired conventional type, extends the full length of the building in alignment with the door 13.

The conveyor belt 14 may be driven in any desired conventional manner and controlled by similar conventional means.

Positioned substantially at right angles to belt 14 are a plurality of gravity conveyors 15, to be more fully described hereinafter. The number as well as the length of conveyors 15 may be varied in accordance with the size and shape of the warehouse.

Referring now particularly to Figure 2, the endless conveyor belt 14 is shown as comprised of a horizontally positioned belt 16 extending over a plurality of rollers 17 which rollers are carried by axles 18, one end of each axle being mounted in a journal 19 carried by a suitable upright 20, and the other end being rotatably mounted in a journal 21 carried by an L-shaped angle iron leg 22 which forms an integral part of each gravity conveyor 15.

Referring now to the gravity conveyors 15 in detail, it will be seen that each is comprised of a frame which includes an angularly inclined pair of spaced apart channel members 23 supported by legs 24, of graduated height, so that the portion of the frame away from conveyor belt 14 is elevated in such manner that packages 25 supported thereon will move by gravity in the direction of conveyor belt 14. Such movement is facilitated by rollers 26 mounted on axles 27 and journalled in the side walls of angle iron members 23, these rollers being spaced apart a distance at least slightly in excess of the diameter of the rollers.

Mounted between legs 22 immediately adjacent conveyor belt 14 is a roller 30 carried by upright extensions 31 and mounted on an axle 32 extending between the upright extensions 31. The roller 30 is at an elevation slightly higher than conveyor belt 14 and also above rollers 26, and therefore serves normally as a stop for the packages 25 on gravity conveyors 15.

Mounted between channels 23 is a plate or platform 35 which carries at its ends (see Figure 4), rollers 36 mounted on stub axles 37 which are adapted for vertical movement in the channels formed by legs 22 and corresponding channels formed by uprights 48 to be more fully described hereinafter. (See Figures 4 and 7.) The plate 35 has secured to the upper surface thereof a plurality of U-shaped brackets 38, the upwardly extending legs 39 of which serve as journals for the ends of axles 40 which carry rollers 41, the latter being spaced between adjacent rollers 26 and adapted for vertical movement with plate 35 in a manner to be more fully described hereinafter.

A transverse angle iron 45 extends between legs 22 and serves to support one end of a pair of spaced angle irons 46 which comprise a drive frame support, the other member of the members 46 being carried by a transversely extending angle iron 47 extending between the foremost pair of legs 24.

The uprights 48 extend upwardly between members 46 and members 23 and serve to accommodate the rear rollers 36 of plate 35, as previously described. Depending from the underside of plate 35 are two pairs of spaced brackets 50 to which are pivotally connected as by means of pivots 51, links 52, which are pivoted at their opposite ends as by means of pivots 53 to offset lugs 54 carried respectively by sprocket wheels 55 and oppositely aligned circular members 56.

There are two sprocket wheels 55, each mounted on an axle 57, the opposite end of each axle 57 carrying one of wheels 56 and each axle being journalled in a pair of supporting journals 58 carried by members 45. Sprocket wheels 55 are connected together by means of a chain 60 for simultaneous rotation, and the rearmost of axles 57 is provided, as best shown in Figure 5, with a second sprocket 61 connected by means of a chain 62 to a sprocket 63 carried by an axle 64 extending through a conventional gear reduction box 65. The other end of axle 64 is connected by means of chain 66 to a sprocket 67 which in turn is mounted on the drive shaft 68 of a conventional electric motor 69 of any desired type, both gear box 65 and motor 69 being mounted on a supporting plate 70 carried by supporting frame members 46.

As best shown in Figure 6, each gravity conveyor 15 is provided with a motor 69, one brush 71 of each motor being connected to a common cold line 71a, while from the other brush 72 of each motor a wire 73 leads to one terminal 74 of a switch 75, of any desired conventional type, each switch 75 being connected to a common hot line 76. The switches 75 may be located at any desired remote control point, and selectively energized to actuate the associated motor 69.

From the foregoing, the operation of the device should be readily understandable. Packages 25 are stacked on gravity conveyors 15 in aligned relation with the plate 35 in its lowered position so that rollers 41 are in substantial alignment with rollers 26, in which position the roller 30 serves to preclude passage of any of the packages onto conveyor belt 14. When it is desired to move the package from its associated gravity conveyor to shipping platform 12, the associated motor 69 is energized, and through the system of chains 66 and 62 and 60, previously described, rotates the sprocket wheels 55 through a half turn to position the offset lugs 54 in the position disclosed in Figures 2 and 3. Whereupon the first package 25 is raised to a position above roller 30 and may then roll by gravity onto the conveyor belt 14 from which point it is moved automatically to the shipping platform 12.

During this operation the rearmost of rollers 41 in its raised position serves as an effective stop against the forward passage of the succeeding package 25. Obviously, additional energization of motor 69 will lower rollers 41 so that the next package 25 is moved by gravity into a position over the rollers 41 from which position it may be transferred to conveyor belt 14, as previously described.

Obviously, any desired number of packages from a single gravity conveyor may be moved to the conveyor belt, and equally obviously a package may be moved from any selected gravity conveyor 15 to conveyor belt 14 as desired, merely by closing the appropriate switch 75.

From the foregoing it will now be seen that there is herein provided an improved apparatus for moving merchandise from the storage position in a warehouse to a shipping platform, which accomplishes all of the objects of this invention and others including many advantages of great practical utility and commercial importance.

As many embodiments may be made of this inventive concept and as many modifications may be made in the embodiment hereinbefore shown and described, it is to be understood that all matter herein is to be interpreted merely as illustrative and not in a limiting sense.

What I claim is:

A selective transfer device for use with inclined gravity rollers having a plurality of spaced parallel rollers and supported on a frame, a stop member at the discharge end of said gravity roller, said transfer device comprising a substantially rectangular plate having a pair of opposed sides, said plate being disposed beneath said gravity roller adjacent the discharge end in spaced parallel relation thereto, one of said sides being fixedly secured to a pair of spaced opposed parallel angle bars, a plurality of U-shaped brackets, each of said brackets having a bight portion and a pair of opposed arms, said bight of each of said brackets being fixedly secured to the other of said sides of said plate, a plurality of rollers rotatably journalled in and disposed intermediate said opposed arms of said brackets, said rollers being interspersed for reciprocating vertical movement intermediate said spaced gravity rollers, spaced pairs of opposing supporting arms, each of said arms having a pair of opposed ends, one of said ends of each of said arms being pivotally connected to said angle bars, spaced pairs of sprocket wheels fixedly secured to opposite ends of shafts, said shafts being rotatably mounted on said frame, said other end of said supporting arms being pivotally connected to said sprocket wheels to effect reciprocal vertical movement of said supporting arms, continuous chains connecting said sprocket wheels for effecting series movement of said wheels, and motor means mounted on said frame, said motor means being connected in driving relation to said sprocket wheels for effecting movement of said wheels.

References Cited in the file of this patent

UNITED STATES PATENTS

| | | |
|---|---|---|
| 1,351,554 | Cowley | Aug. 31, 1920 |
| 1,362,034 | Olson | Dec. 14, 1920 |
| 1,525,870 | Lee | Feb. 10, 1925 |
| 1,602,753 | Davis | Oct. 12, 1926 |
| 2,071,770 | Shield | Feb. 23, 1937 |
| 2,388,283 | Porter | Nov. 6, 1945 |
| 2,696,284 | Scott et al. | Dec. 7, 1954 |
| 2,698,699 | Skillman | Jan. 4, 1955 |

FOREIGN PATENTS

| | | |
|---|---|---|
| 340,439 | Great Britain | Jan. 1, 1931 |